US010250607B2

(12) United States Patent
Persinger et al.

(10) Patent No.: US 10,250,607 B2
(45) Date of Patent: Apr. 2, 2019

(54) CONTROL SYSTEMS AND METHODS FOR PROVIDING USER ACCESS TO EXTERNAL DEVICES VIA COMMUNICATIONS NETWORKS

(71) Applicant: PM Investigations, Inc., Atlanta, GA (US)

(72) Inventors: James B. Persinger, Atlanta, GA (US); Evelyn Persinger, Atlanta, GA (US)

(73) Assignee: PM INVESTIGATIONS, INC., Atlanta, GA (US)

( * ) Notice: Subject to any disclaimer, the term of this patent is extended or adjusted under 35 U.S.C. 154(b) by 196 days.

(21) Appl. No.: 15/604,960

(22) Filed: May 25, 2017

(65) Prior Publication Data

US 2018/0069861 A1 Mar. 8, 2018

Related U.S. Application Data

(60) Provisional application No. 62/384,667, filed on Sep. 7, 2016.

(51) Int. Cl.
*H04L 29/06* (2006.01)
*H04W 4/14* (2009.01)

(52) U.S. Cl.
CPC .......... *H04L 63/10* (2013.01); *H04L 63/0807* (2013.01); *H04L 63/102* (2013.01); *H04L 63/107* (2013.01); *H04L 63/108* (2013.01); *H04W 4/14* (2013.01)

(58) Field of Classification Search
CPC ..... H04L 63/10; H04L 63/108; H04L 63/102; H04L 63/107; H04L 63/0807; H04W 4/14
See application file for complete search history.

(56) References Cited

U.S. PATENT DOCUMENTS

| | | | |
|---|---|---|---|
| 2008/0137612 A1* | 6/2008 | Gallagher | H04W 8/04 370/331 |
| 2016/0234174 A1* | 8/2016 | Zizi | H04L 9/06 |
| 2017/0220793 A1* | 8/2017 | Birgisson | G06F 21/45 |

\* cited by examiner

*Primary Examiner* — Amir Mehrmanesh
(74) *Attorney, Agent, or Firm* — McClure, Qualey & Rodack, LLP

(57) ABSTRACT

Control systems and methods for providing a user with access to an external device via a communication network are provided, in which the external device is connected to a first port having lines including at least one power line and at least one data line, first and second of the lines being connected to a first switch and a second switch, respectively, of a first set of switches. A representative method includes: operating in an access-denied mode, in which one of the first set of switches is open to electrically disable the first port; receiving access request information requesting access to communicate with the external device; determining whether the user is authorized access; if the user is authorized access, providing the user an approval code; and in response to receiving login information and the approval code from the user, operating in the access-approved mode, in which the first port is enabled for a predetermined time period.

19 Claims, 6 Drawing Sheets

CONTROL SYSTEMS AND METHODS FOR PROVIDING USER ACCESS TO EXTERNAL DEVICES VIA COMMUNICATIONS NETWORKS

CROSS REFERENCE TO RELATED APPLICATION

This utility patent application is based on and claims priority to U.S. provisional application 62/384,667, filed 7 Sep. 2016, which is incorporated by reference herein in its entirety.

BACKGROUND

Technical Field

The disclosure relates to the protection of network-connected devices or internet-connected devices from unauthorized access.

Description of the Related Art

Preventing unauthorized access to network-connected devices (e.g., servers, data storage devices, etc.) or internet-connected devices (e.g., cameras, televisions, security monitors, etc.) is a challenging endeavor. Of significance, the relative convenience of use of network-connected and internet-connected devices tends to be a source of vulnerability in that these devices may be subject to hacking by virtue of their connectivity or due to outdated firmware or software. Thus, there is a desire to decrease the vulnerability of these devices without eliminating the convenience of their use.

SUMMARY

Control systems and methods for providing a user with access to an external device via a communication network are provided. An example embodiment of a control system comprises: a control device having processor circuitry, a first port, and a first set of switches; the first port having lines including at least one power line and at least one data line, a first of the lines being connected to a first switch of the first set of switches, a second of the lines being connected to a second switch of the first set of switches; the processor circuitry being configured to control positions of the first set of switches between an access-approved mode, in which the first set of switches are closed to electrically enable the first port, and an access-denied mode, in which one of the first set of switches is open to electrically disable the first port; the processor circuitry being configured to: operate in the access-denied mode as a default mode of operation such that the user is unable to access the external device via the communication network, the external device being externally connected to the control device via the first port; receive access request information from the user via the communication network requesting access to communicate with the external device; determine whether the user is authorized access in response to receiving the access request information; if the user is authorized access, provide the user an approval code via the communications network; and in response to receiving login information and the approval code from the user via the communication network, operate in the access-approved mode for a predetermined time period such that the user is able to access the external device through the control device via the first port during the predetermined time period.

An example embodiment of a method comprises: operating in an access-denied mode, in which one of the first set of switches is open to electrically disable the first port, as a default mode of operation such that the user is unable to access the external device via the communication network; receiving access request information from the user via the communication network requesting access to communicate with the external device; determining whether the user is authorized access in response to receiving the access request information; if the user is authorized access, providing the user an approval code via the communications network; and in response to receiving login information and the approval code from the user via the communication network, operating in the access-approved mode, in which the first set of switches are closed to electrically enable the first port, for a predetermined time period such that the user is able to access the external device via the first port during the predetermined time period Other features and/or advantages will become apparent from the following detailed description of the preferred but non-limiting embodiments. The following description is made with reference to the accompanying drawings.

DETAILED DESCRIPTION

Figure 1:
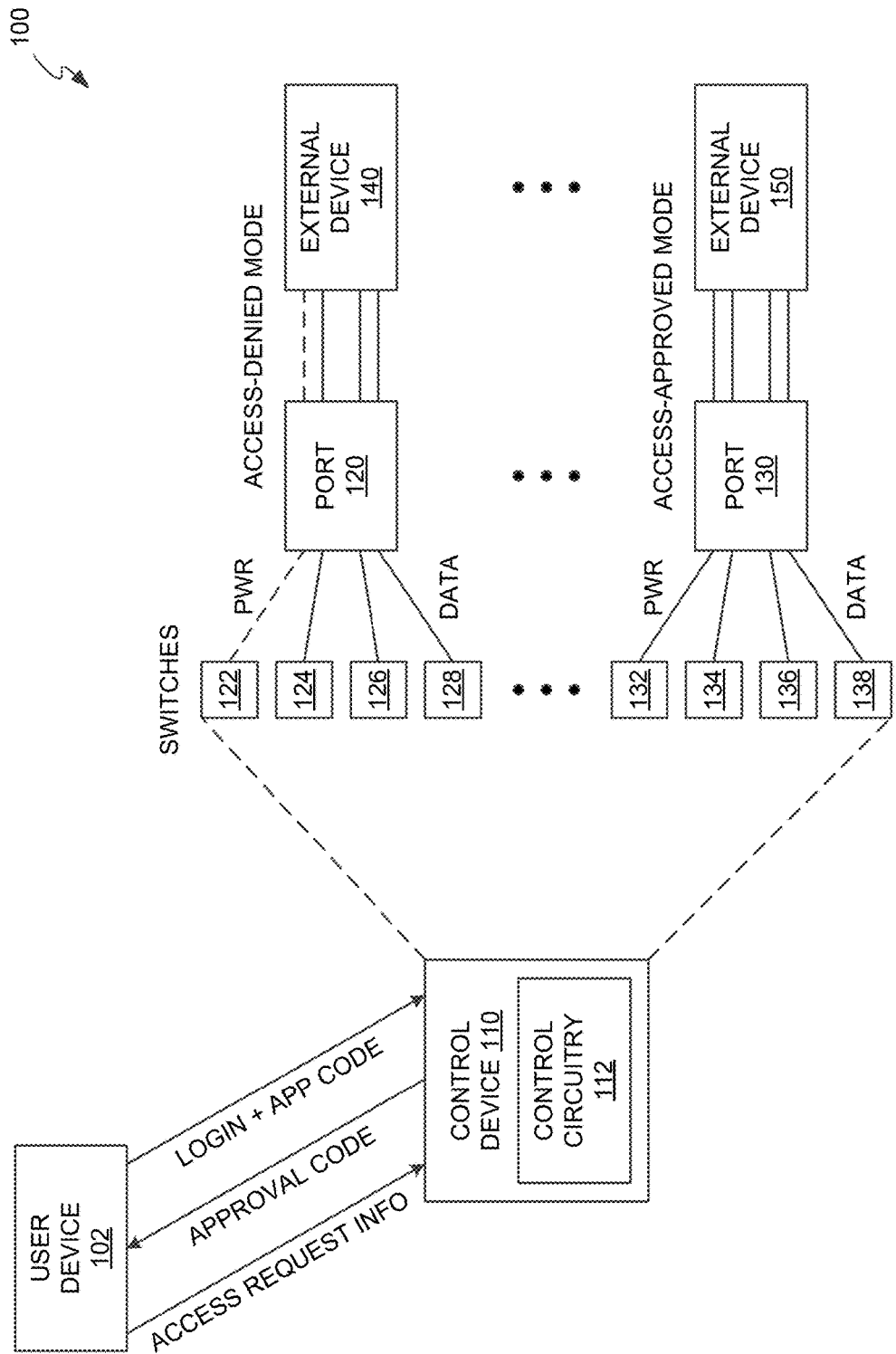
FIG. 1 is a schematic diagram of an example embodiment of control system.

Having summarized various aspects of the present disclosure, reference will now be made in detail to that which is illustrated in the drawings. While the disclosure will be described in connection with these drawings, there is no intent to limit the scope of legal protection to the embodiments disclosed herein. Rather, the intent is to cover all alternatives, modifications and equivalents included within the scope of the disclosure as defined by the appended claims.

In this regard, control systems and methods for providing a user with access to an external device via a communication network are provided. In some embodiments, a control device is provided that functions as an enhanced firewall. In particular, the control system may incorporate a control device that is interconnected between a communications network and external devices (e.g., data storage devices) via respective ports. One or more lines (e.g., power and data lines) of each of the ports are selectively disabled by the control device (thereby preventing use of the connected external devices) unless appropriate user interaction with the control device is demonstrated, after which an access-approved mode may be exhibited for permitting access to the external device.

An example embodiment of control system for providing a user with access to an external device via a communication network is depicted schematically in FIG. 1. As shown in FIG. 1, control system 100 incorporates a control device 110 that includes control circuitry 112, multiple ports (120, 130), and multiple switches (122, 132). Each port (e.g., a USB port) is configured to receive a corresponding connector of an external device (e.g., external device 140) so that connection between the port and the external device facilitates communication therebetween and thus access to information that may be stored on the external device. Each port includes a corresponding set of lines, such as a power line and a data line, with each of the lines being connected to a corresponding one of the switches. In some embodiments, the switches are double-pole, double-throw switches, whereas in others, other configurations are used (e.g., switches of a FPGA). In this example, the power line for port 120 is connected to switch 122, the data line for port 120 is connected to switch 128, the power line for port 130 is connected to switch 132, and the data line for port 130 is connected to switch 138.

Control device 110 is configured to communicate with a user device 102 (e.g., a mobile phone) via a communications network so that the user may request access to information stored on one or more of the external devices. In particular, control circuitry 112 is configured to control positions of the switches to selectively exhibit an access-approved mode, in which the switches are closed to electrically enable one or more of the ports, and an access-denied mode, in which at least one of the switches is open (e.g., the switches are opened randomly) to electrically disable a corresponding port. In some embodiments, more than one of the switches may be controlled to be open at the same time.

In this embodiment, control circuitry 112 is configured to operate in the access-denied mode as a default mode of operation so that a user is unable to access any of the external devices via the communication network since the external devices are not able to communicate unless all of the switches of a port are closed. In operation, control circuitry 112 is further configured to receive access request information from the user via the communication network to request access to communicate with the external device. In some embodiments, the access request information may be provided by the user based on a user input, such as via SMS (text message). In other embodiments, access request information may be provided automatically based on a location of the user (such as when a user enters an office associated with the external device).

Control circuitry 112 determines whether the user is authorized access in response to receiving the access request information. In some embodiments, this may be accomplished by either a combination of or individually controlled with SMS, MMS, WiFi, Bluetooth, DTMF, voice recognition, and/or other communication methodologies. If it is determined by the control circuitry that the user is authorized access, an approval code (e.g., a random code) is provided to the user via the communications network, such as via SMS. The user may then communicate login information (e.g., username and password) and the approval code from user device 102 to control device 110. In response to receiving the login information and the approval code, the control circuitry may exhibit the access-approved mode for a predetermined time period so that the user is able to access a requested (or otherwise designated) external device (e.g., device 140) via the corresponding port (e.g., port 120) during the predetermined time period. In the example of FIG. 1, this would involve closing switch 122 in order to connect the power line (which is currently depicted in dashed lines to indicate an open condition) to port 120. In some embodiments, the predetermine time period may be user selectable. For instance, the predetermine time period may be selected by the user and designated in the access request information.

In some embodiments, a database may be used to store the firmware and/or software version of each connected device (such as with the manufacturer's "update" URL). In operation, the control circuitry may poll the database for values that can be matched to the manufacturer's website for better version control. If the value stored in the database is less than the manufacturer (indicating that the currently utilized version is not up to date), a notification may be sent (such as to an administrator of the system) indicating that a "device" is not up to date (either its firmware or software is outdated).

If an update of the "device" is desired, a similar process to that described previously may be followed to "activate" the device. Once activated, the device is then updated followed by placing it back into "offline" mode (disconnected). Of significance, the relative convenience of use of network-connected and internet-connected devices tends to be a source of vulnerability in that these devices may be subject to hacking by virtue of their connectivity or due to outdated firmware or software. This functionality may tend to alleviate these perceived shortcomings.

Figure 2:
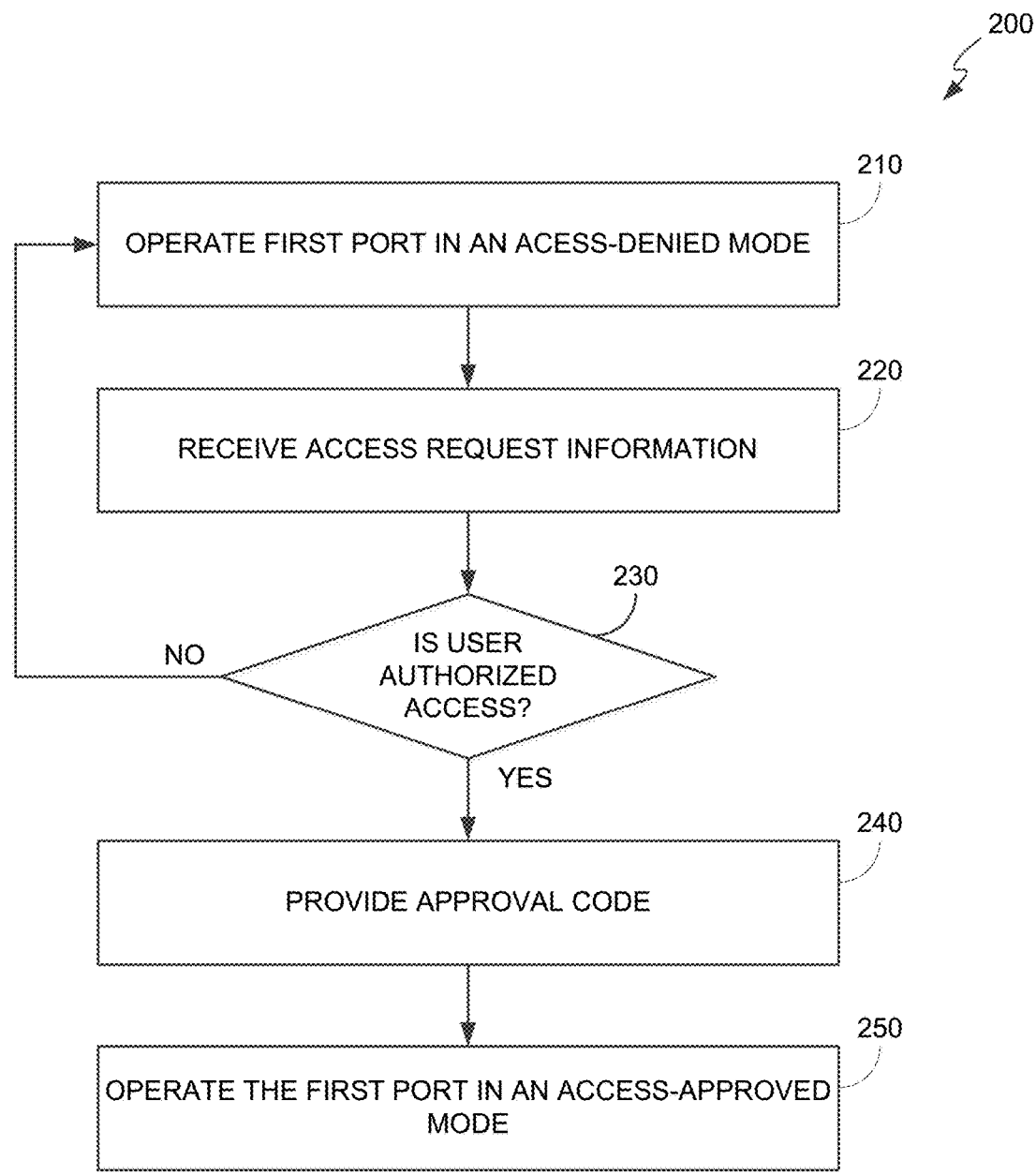
FIG. 2 is a flowchart of an example embodiment of method.

An example embodiment of a method that may be used for implementing at least some of the functionality provided by control system 100 (e.g., the functionality associated with control circuitry 110) is depicted in FIG. 2. As shown in FIG. 2, the method (or process) 200 may be construed as beginning in block 210, in which a first port is operated in an access-denied mode as a default mode of operation so that the user is unable to access an external device connected to the first port. Notably, in the access-denied mode, at least one of a first set of switches of the port is open to electrically disable the first port. In block 220, access request information is received from the user via the communication network, with the access request information requesting access to communicate with the external device. In block 230, in response to receiving the access request information, a determination is made as to whether the user is authorized access. Then, if the user is authorized access, the process proceeds to block 240, in which the user is provided with an approval code via the communications network. In block 250, in response to receiving login information and the approval code from the user via the communication network, the first port is operated in an access-approved mode, in which the first set of switches are closed to electrically enable the first port, for a predetermined time period. As such, the user is able to access the external device via the first port during the predetermined time period. However, if it is determined in block 230, that the user is not authorized access, the process may return to block 210, which results in the first port continuing to exhibit the access-denied mode.

Figure 3:
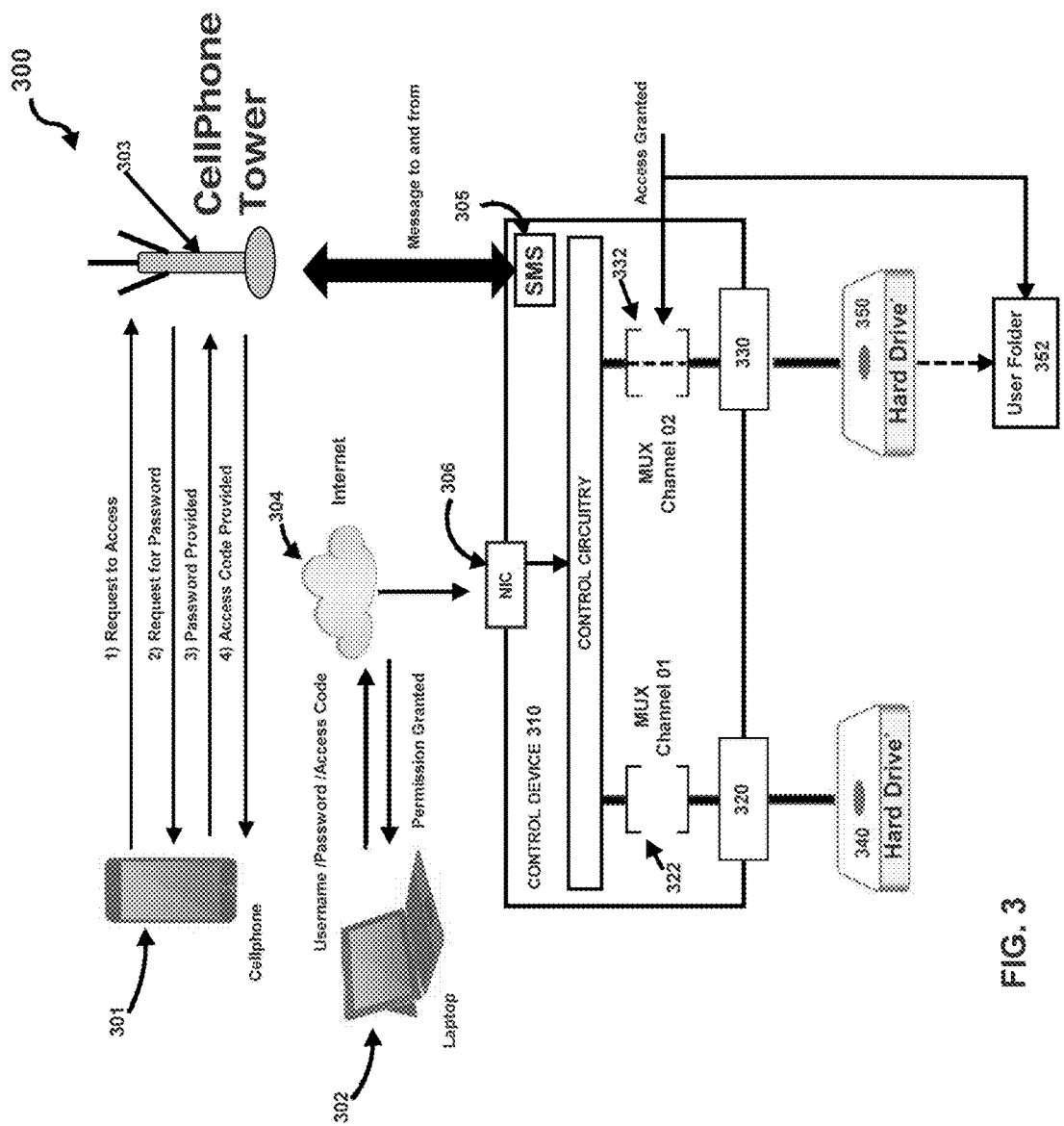
FIG. 3 is a schematic diagram of another example embodiment of control system.

Another example embodiment of control system is depicted schematically in FIG. 3. As shown in FIG. 3, control system 300 incorporates a control device 310 that includes control circuitry 312, multiple ports (320, 330), and multiple switches (322, 332). Each port (e.g., a USB port or network port) is configured to receive a corresponding connector of an external device (e.g., external device 340, 350) so that connection between the port and the external device facilitates communication. So configured, access may be provided to information (e.g., file folder 352) that may be stored on the external device. In this embodiment, switches 322 and 332 are configured as multiplexers that are controlled by control circuitry 312. Each port (320, 330) includes a corresponding set of lines, with each set of lines being connected to a corresponding one of the multiplexers.

Control device 310 is configured to communicate with a user device, such as via mobile phone 301 or laptop 302, for example, so that the user may request access to information (e.g., information in file 352) stored on one or more of the external devices. For instance, a user of phone 301 may communicate a request for access to control device 310 via a cellphone network (e.g., using tower 303 and an SMS-configured I/O device 305), whereas another user may communicate a request for access via another communications network (e.g., using the internet 304 and a network interface connection 306). In this embodiment, control device 310 responds to the request for access by determining whether the user is authorized access by requesting a password from the user. In this embodiment, the request for password is provided to the user by the same communications network used for the request for access. In response to receiving the requested password from the user, control device 310 provides an approval (access) code to the user, which enables the user to gain access to the requested external device and/or information. In some embodiments, this may involve the user communicating login information and the approval code from the user device.

In response to receiving the required information from the user, control device 310 configures the appropriate circuitry to enable communication between the user device and the external device. In this embodiment, providing of access to file 352 involves control circuitry 312 configuring multiplexer 332 to enable all of the lines associated with port 330 so that information may be communicated between the user and external device 350.

As such, a bi-directional internal switching system is provided that connects to any number of external devices using USB, Cellular, Ethernet, Wi-Fi, Bluetooth, or similar. In some embodiments, a random rotating sequence for switching the connection lines may be used to provide non-connected states or the external devices. Users who can gain access to information/folders through external devices (which exhibit connected or access-approved states) do so through a set of logical gates and/or permissions by passing through switches that control access to information/folders.

In this regard, a control device (e.g., control device 310) may protect devices such as hard drives, flash drives, computers, servers, printers, digital cameras, smart televisions, security cameras, web-based cameras, and other digital devices by allowing the device to be in a controlled state of "disconnection". The plugged-in device (actually physically connected to the MUX board) is actually not available (or generally subject to discovery by hackers) because one of the physical "wires" required for operation is not connected all the time. The actual wire(s) that is disconnected may be changed by random patterns. In addition, the frequency of change, the duration of change, and/or the number of wires exhibiting disconnected may vary.

In some embodiments, if an authorized user of an external device has been authorized access to that device, the device may remain "active" (access-approved mode) as long as the user is "actively" doing something with that device. In such an embodiment, a prolonged period of inactivity may result in disconnection (reversion to an access-denied mode). Disconnection may also occur if the user properly logs out or if a predetermined time period for access has elapsed. In some embodiments, an amount of time for access may be requested by the user.

Figure 4:
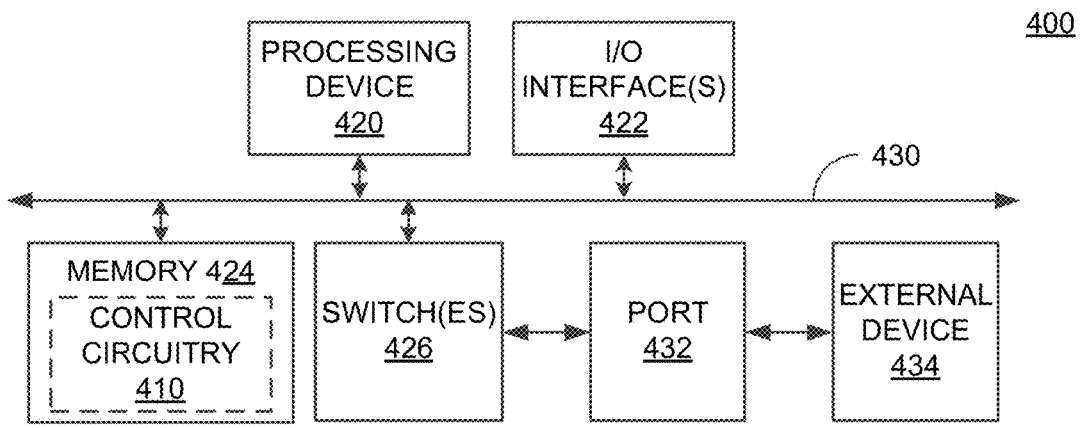
FIG. 4 is a schematic diagram of another example embodiment of control system.

Another example embodiment of a control device is depicted schematically in FIG. 4. As shown in FIG. 4, control device 400 includes a processing device 420 (processing circuitry), input/output (I/O) interface(s) 422, a memory 424, and one or more switches 426, with each communicating across a local data bus 430. Additionally, memory 426 may incorporate control circuitry 410, which includes executable instructions for particularly configuring processing device 420 in order to perform functionality associated with the providing of access to information stored on external device 434. In particular, external device 434 is selectively connected/disconnected to control circuitry 410 through port 432 via switch 426.

Processing device 420 may include a custom made or commercially available processor, a central processing unit (CPU) or an auxiliary processor among several processors, a microprocessor, a semiconductor-based microprocessor (in the form of a microchip), one or more application specific integrated circuits (ASICs), a plurality of suitably configured digital logic gates, and other electrical configurations comprising discrete elements both individually and in various combinations to coordinate the overall operation of the system.

The I/O interface(s) 422 may facilitate communication with one or more devices, such as a mobile phone or other device that a user may utilize to facilitate communication with control device 400.

Memory 424 can include any one or a combination of volatile memory elements (e.g., random-access memory (RAM, such as DRAM, and SRAM, etc.)) and nonvolatile memory elements. The memory typically comprises a native operating system, one or more native applications, emulation systems, or emulated applications for any of a variety of operating systems and/or emulated hardware platforms, emulated operating systems, etc. For example, the applications may include application specific software which may comprise some or all the components of control circuitry 310. In accordance with such embodiments, the components are stored in memory and executed by the processing device 420.

Figure 5:
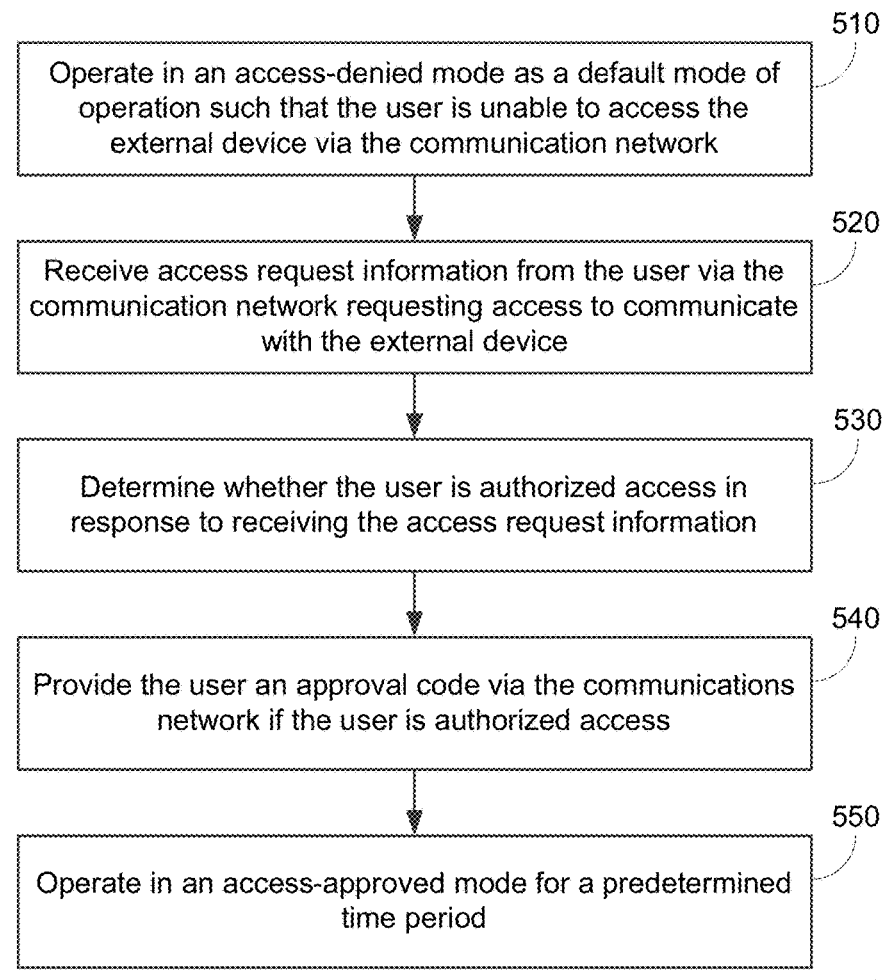
FIG. 5 is a flowchart of another example embodiment of method.

In operation, control device 400 may enable a user to access information stored on external device 434 in a manner depicted in the flow chart of FIG. 5. As shown in FIG. 5, the functionality (or method) 500 associated with control circuitry may be construed as beginning in block 510, in which the control device is operated in an access-denied mode as a default mode of operation as a default mode so that the user is unable to access an external device (e.g., device 434 of FIG. 4). In block 520, access request information is received from the user via the communication network, with the access request information requesting access to communicate with the external device. In block 530, in response to receiving the access request information, a determination is made as to whether the user is authorized access. Then, if the user is authorized access, the process proceeds to block 540, in which the user is provided with an approval code via the communications network. In block 550, in response to receiving the approval code (and any other required information) from the user via the communication network, the control device is operated in an access-approved mode, in which the user is enabled to access the external device for a predetermined time period.

In some embodiments, three levels of authentication are required before a user can connect to an external device. By way of example, a user sends an SMS (text message) to the control device, which checks to determine if the user is truly authenticated (password and/or IEMI) and will send back an approval code to the user's device (e.g., cellphone). The approval code (which may be 1-159 alphanumeric characters in length, for example) may be set to expire in X seconds (note that such a predetermined time may be decided by an administrator). Once the user receives the approval code, the user may use an application that requires the three access details (i.e., username, password, and approval "access" code).

Figure 6:
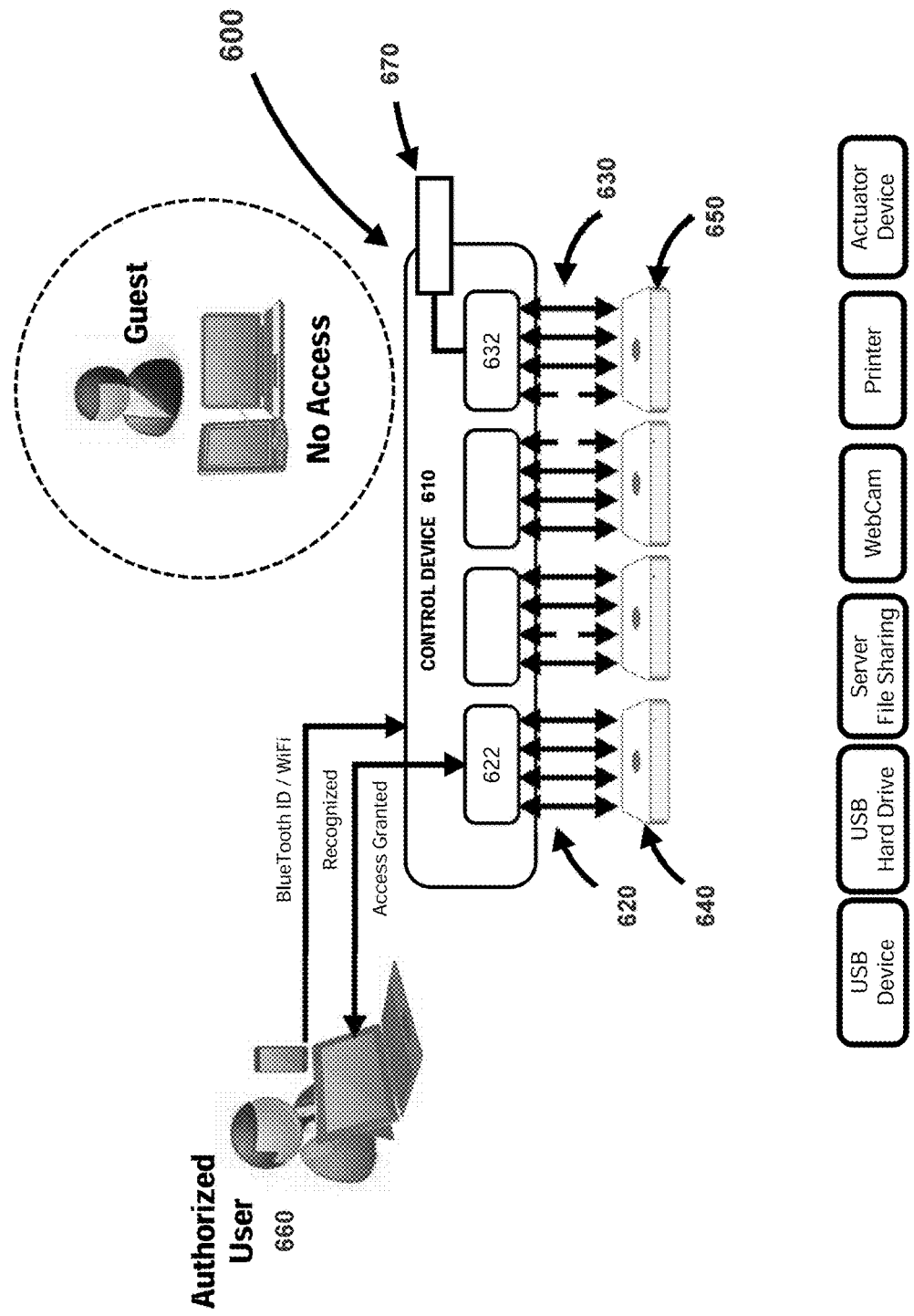
FIG. 6 is a schematic diagram of another example embodiment of control system.

Another example embodiment of control system is depicted schematically in FIG. 6. In FIG. 6, control system 600 incorporates a control device 610 that includes control circuitry (not shown), multiple ports (620, 630), and multiple switches (622, 632). Each port is configured to receive a corresponding connector of an external device (e.g., external device 640, 650) so that connection between the port and the external device facilitates communication. So configured, access may be provided to information that may be stored on the external device.

In this embodiment, the cellphone MAC address or Internal [local] IP address associated with an authorized user 660 has been added to the user's profile, which may be stored on control device 610 (e.g., stored in an encrypted format). So configured, if the user's cellphone has WiFi enabled and activated, when that user comes within WiFi range of control device 610, the control device may automatically provide an approval code to the user's cellphone. This may eliminate the need of the user to send a request fro access to the control device via SMS, for example, and wait for an approval code. In some embodiments, the approval code may not expire until the user deactivates the WiFi on his phone or simply moves out of range from the WiFi. Access may be obtained by the user as described before. In some embodiments, Bluetooth communication between a user and a control device may be used to facilitate automatic providing of an approval code and/or deactivation.

Also depicted in the embodiment of FIG. 6 is an optional feature involving the use of a manually-operated switch. In particular, control device 610 incorporates a switch 670 that is configured to alter the functionality of one or more associated ports, so that the ports may be operated in either in input/output mode or an input-only mode. Specifically, when operated in the input/output mode, when access-enabled, the port is able to function as a bi-directional port to both input and output data as desired. However, when in the input-only mode, when access-enabled, the port is only able to function as a uni-directional port to input (receive) data, thus potentially providing an added level of security.

Figure 7:
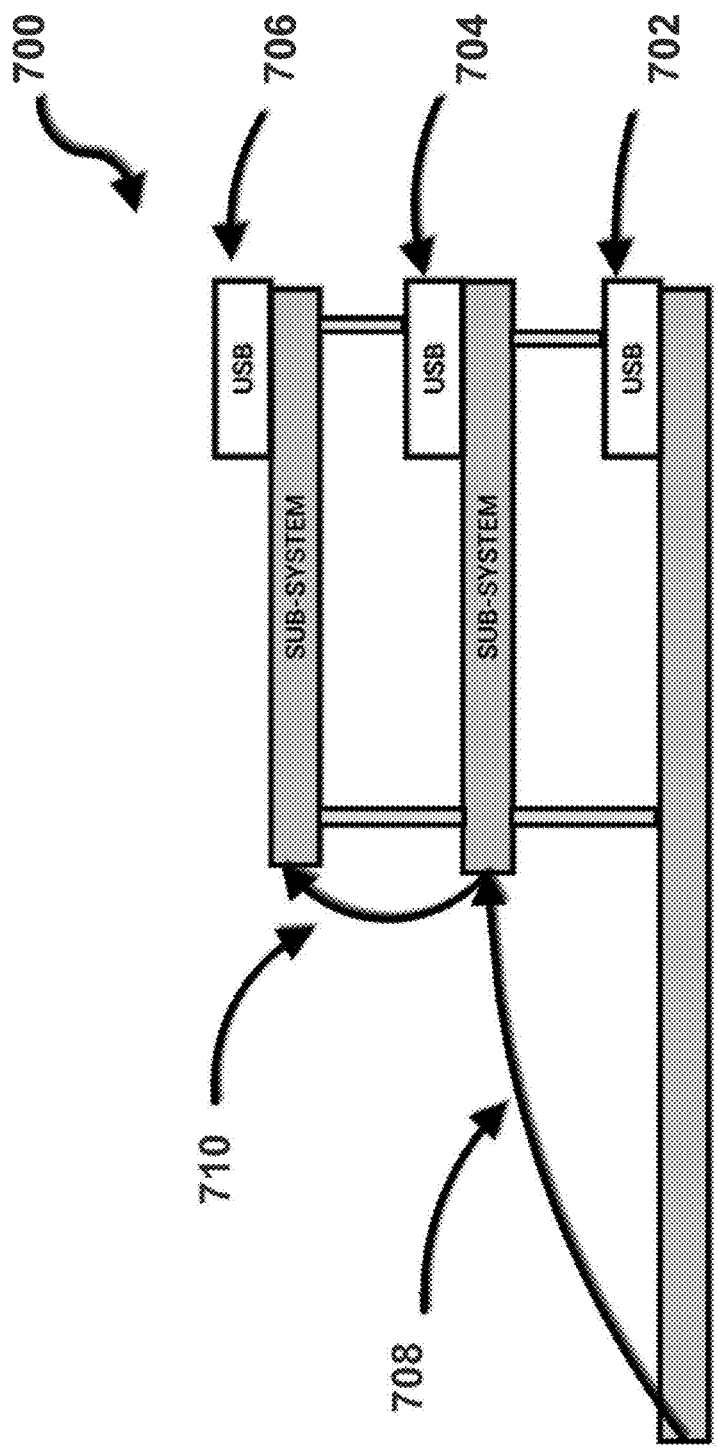
FIG. 7 is a schematic diagram of another example embodiment of control system.

If a user runs out of device ports, additional control devices may be daisy-chained to increase the number of external devices that may be controlled/accessed by a single control system. An example embodiment depicting this configuration is depicted in FIG. 7, in which control system 700 includes control devices 702, 704 and 706 daisy-chained vi connectors 708 and 710 (e.g., cable ribbon), respectively. Once power is applied, and after a self-test is performed, the series of relays that are connected to external devices (not shown) are checked. Once the system test is performed, and providing the system test passes, the random line matrix generator becomes active, and lines will randomly disconnect to prevent access until appropriate authorizations are granted.

With regards to the accompanying flowchart(s), it should be emphasized that the functionality attributed to the various components can be implemented in a single process or application executed in multiple processes or applications. Furthermore, it should be emphasized that the separation or segmentation of functionality as discussed herein is presented for illustrative purposes only as various functions may be combined or performed concurrently.

Any such flowcharts show examples of the functionality and operation of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although any such flowchart(s) show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The various components described herein can include at least one processing circuit, where such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the components described herein can be stored in one or more storage devices and be executable by one or more processors.

The various components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

One or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Various functions, functional components and/or blocks have been described herein. As will be appreciated by persons skilled in the art, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuity in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

It is emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A control system for providing a user with access to an external device via a communication network, the control system comprising:
    a control device having processor circuitry, a first port, and a first set of switches;
    the first port having lines including at least one power line and at least one data line, a first of the lines being connected to a first switch of the first set of switches, a second of the lines being connected to a second switch of the first set of switches;
    the processor circuitry being configured to control positions of the first set of switches between an access-approved mode, in which the first set of switches are closed to electrically enable the first port, and an access-denied mode, in which one of the first set of switches is open to electrically disable the first port;
    the processor circuitry being configured to:
        operate in the access-denied mode as a default mode of operation such that the user is unable to access the external device via the communication network, the external device being externally connected to the control device via the first port;
        receive access request information from the user via the communication network requesting access to communicate with the external device;
        determine whether the user is authorized access in response to receiving the access request information;
        if the user is authorized access, provide the user an approval code via the communications network; and
        in response to receiving login information and the approval code from the user via the communication network, operate in the access-approved mode for a predetermined time period such that the user is able to access the external device through the control device via the first port during the predetermined time period;
    wherein, in the access-denied mode, the processor circuitry controls the first set of switches to be open at random; and
    wherein each of the switches is configured as either a mechanical switch, programmable logic or solid-state circuitry.

2. The control system of claim 1, wherein the switches are double-pole, double-throw switches.

3. The control system of claim 1, wherein the first port is a USB port.

4. The control system of claim 1, wherein the login information comprises a user name and password.

5. The control system of claim 1, wherein the access request information is provided by the user via SMS.

6. The control system of claim 1, wherein the access request information is provided automatically based on a location of the user.

7. The control system of claim 1, wherein the approval code is a random code.

8. The control system of claim 1, wherein the approval code is provided to the user via SMS.

9. The control system of claim 1, wherein the predetermine time period is user selectable.

10. The control system of claim 9, wherein the predetermine time period is designated in the access request information.

11. The control system of claim 1, wherein the predetermine time period is designated in the access request information.

12. The control system of claim 1, wherein the processor circuitry is further operative to determine whether the external device includes up-to-date firmware or software while operating in the access-approved mode for the external device.

13. The control system of claim 1, wherein at least one of the switches is a double-pole, double-throw switch.

14. The control system of claim 1, at least one of the switches is a field programmable gate array (FPGA) switch.

15. The control system of claim 1, at least one of the switches is a multiplexer switch.

16. A control method for providing a user with access to an external device via a communication network, the external device being connected to a first port having lines including at least one power line and at least one data line, a first of the lines being connected to a first switch of a first set of switches, a second of the lines being connected to a second switch of the first set of switches, the method comprising:
    operating in an access-denied mode, in which at least one of the first set of switches is open randomly to electrically disable the first port, as a default mode of operation such that the user is unable to access the external device via the communication network;
    receiving access request information from the user via the communication network requesting access to communicate with the external device;
    determining whether the user is authorized access in response to receiving the access request information;
    if the user is authorized access, providing the user an approval code via the communications network; and
    in response to receiving login information and the approval code from the user via the communication network, operating in the access-approved mode, in which the first set of switches are closed to electrically enable the first port, for a predetermined time period such that the user is able to access the external device via the first port during the predetermined time period;

wherein each of the switches is configured as either a mechanical switch, programmable logic or solid-state circuitry.

17. The method of claim 16, further comprising determining whether the external device includes up-to-date firmware or software while operating in the access-approved mode.

18. The control system of claim 16, wherein the access request information is either provided by the user via SMS or provided automatically based on a location of the user.

19. The control system of claim 16, wherein the predetermine time period is user selectable.

* * * * *